(12) United States Patent
Yang

(10) Patent No.: US 8,696,519 B2
(45) Date of Patent: Apr. 15, 2014

(54) DIFFERENTIAL WHEEL GROUP WITH NORMALLY CLOSED BRAKES AT TWO OUTPUT SIDES THEREOF

(76) Inventor: Tai-Her Yang, Dzan-Hwa (TW)

( * ) Notice: Subject to any disclaimer, the term of this patent is extended or adjusted under 35 U.S.C. 154(b) by 408 days.

(21) Appl. No.: 12/659,638

(22) Filed: Mar. 16, 2010

(65) Prior Publication Data
US 2011/0230294 A1 Sep. 22, 2011

(51) Int. Cl.
*B60T 13/00* (2006.01)
(52) U.S. Cl.
USPC ........................................ 477/199; 188/167
(58) Field of Classification Search
USPC .......... 477/199, 200, 201, 202, 906; 303/122, 303/122.09; 188/167, 170, 173, 171
See application file for complete search history.

(56) References Cited

U.S. PATENT DOCUMENTS

| | | | | |
|---|---|---|---|---|
| 2,948,359 | A * | 8/1960 | Barrett | 188/106 R |
| 3,200,914 | A * | 8/1965 | Downs et al. | 477/201 |
| 3,631,944 | A * | 1/1972 | Courtenay et al. | 477/199 |
| 3,661,234 | A * | 5/1972 | Moederndorfer et al. | 188/170 |
| 3,912,057 | A * | 10/1975 | Krouse et al. | 192/219 |
| 4,072,360 | A * | 2/1978 | Carroll et al. | 303/2 |
| 4,193,467 | A * | 3/1980 | Simmons | 180/271 |
| 4,274,680 | A * | 6/1981 | Sieving et al. | 303/9.61 |
| 4,400,039 | A * | 8/1983 | Ogata | 303/3 |
| 4,572,319 | A * | 2/1986 | Fontaine | 180/273 |
| RE35,055 | E * | 10/1995 | Paquet et al. | 188/18 A |
| 5,796,192 | A * | 8/1998 | Riepl | 310/67 R |
| 5,992,578 | A * | 11/1999 | Lallier | 188/72.3 |
| 6,675,940 | B2 * | 1/2004 | Maurice | 188/171 |
| 7,393,065 | B2 * | 7/2008 | Craig et al. | 303/122.09 |
| 2009/0065273 | A1 * | 3/2009 | Wyatt et al. | 180/65.8 |

* cited by examiner

*Primary Examiner* — Roger Pang
(74) *Attorney, Agent, or Firm* — Bacon & Thomas, PLLC

(57) ABSTRACT

The present invention relates to a drive system employing single drive power through the differential wheel group to drive two differential output shafts thereof, in which a normal closed brake is individually installed at each of two differential output ends, to prevent the shortcoming of the ineffective parking function caused by single side sliding when single side being suspended or parking.

4 Claims, 2 Drawing Sheets

DIFFERENTIAL WHEEL GROUP WITH NORMALLY CLOSED BRAKES AT TWO OUTPUT SIDES THEREOF

BACKGROUND OF THE INVENTION (a) Field of the Invention

The present invention relates to a drive system employing single drive power through the differential wheel group to drive two differential output shafts thereof, in which a normal closed brake is individually installed at each of two differential output ends, to prevent the shortcoming of the ineffective parking function caused by single side sliding when single side being suspended or parking.

(b) Description of the Prior Art

For the conventional differential wheel group with two output shafts, the equipped normal closed brake for brake and parking is often installed singly at the input shaft of the differential wheel group, to brake the running wheels of differential output shafts at two sides through the differential wheel group for parking, and the shortcoming is that: when the differential wheel group is moving and suddenly braked, or is parked at a slope, if one wheel at one side does not touch the ground because of single side suspension, or if the running wheel driven by one output shaft skids on the ground, the running wheel driven by another output shaft will make differential rotation accordingly, thus accident is caused by ineffective parking function, or situ rotation for the parked vehicle is happened by pushing, the above-mentioned are potential difficulties for the vehicle with the differential wheel group used as substitute for walk or the two-wheel driven wheelchair.

SUMMARY OF THE INVENTION

The differential wheel group with normal closed brakes at two output sides thereof according to the present invention relates to a drive system with differential wheel group, in which one end is for inputting driving power and the differential wheel output shafts at two sides are for driving running wheels, and normal closed brakes are individually installed at two differential output shafts or running wheels, to ensure the function of the brake or parking when one wheel at one side does not touch the ground because of single side suspension, or when the one side skids on the ground, or to prevent the parked vehicle from situ rotation caused by pushing.

Figure 1:
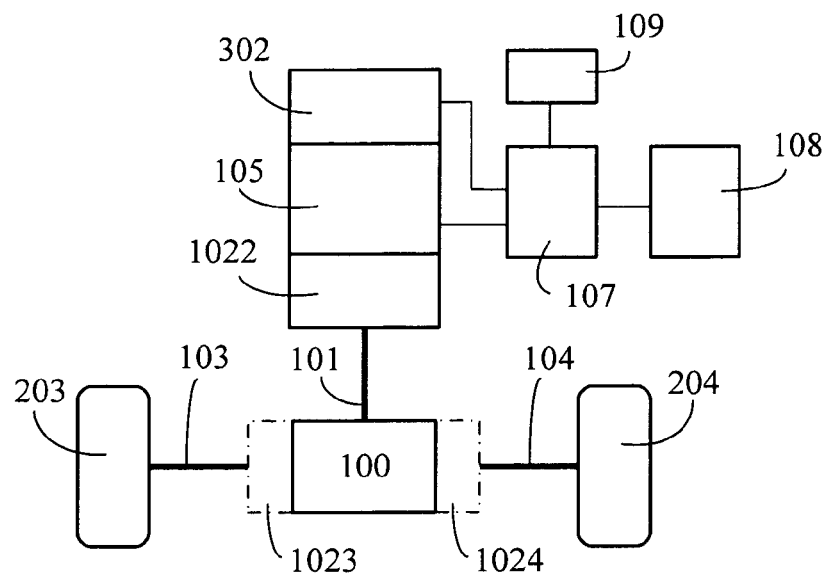
FIG. 1 is a structural schematic view showing the embodiment of the normal closed brake installed at the power input shaft side of the conventional differential wheel group.

DESCRIPTION OF MAIN COMPONENT SYMBOLS (100): Differential wheel group
(101): Input shaft
(103): First differential output shaft
(104): Second differential output shaft
(105): Rotary power source
(107): Control device
(108): Drive energy supply device
(109): Handling device
(203): First running wheel
(204): Second running wheel
(302), (303), (304): Normal closed brake
(1022), (1023), (1024): Transmission

DETAILED DESCRIPTION OF THE PREFERRED EMBODIMENTS

For conventional differential wheel group with two output shafts, the installed status of the equipped brake and normal closed brake for parking is that single normal closed brake is often installed at the input shaft of the differential wheel group, to brake the running wheels of differential output shafts at two sides through the differential wheel group for parking, as shown in FIG. 1 is the normal closed brake (302) for brake and parking equipped in the conventional differential wheel group (100) with two output shafts (103) and (104), wherein the single normal closed brake (302) is often installed at an input shaft (101) of the differential wheel group (100), to brake running wheels (203) and (204) of the differential output shafts (103) and (104) at two sides through the differential wheel group (100) for parking, and the shortcoming is that: when the differential wheel group is moving and suddenly braked, or is parked at a slope, if one wheel at one side does not touch the ground because of single side suspension, or if the running wheel driven by one output shaft skids on the ground, the running wheel driven by another output shaft will make differential rotation accordingly, thus accident is caused by ineffective parking function, or situ rotation for the parked vehicle is happened by pushing, the above-mentioned are potential difficulties for the vehicle with the differential wheel group used as substitute for walk or the two-wheel driven wheelchair.

The differential wheel group with normal closed brakes at two output sides thereof according to the present invention relates to a drive system with differential wheel group, in which one end is for inputting driving power and the differential wheel output shafts at two sides are for driving running wheels, and normal closed brakes are individually installed at two differential output shafts or running wheels, to ensure the function of the brake or parking when one wheel at one side does not touch the ground because of single side suspension, or when the one side skids on the ground, or to prevent the parked vehicle from situ rotation caused by pushing.

Figure 2:
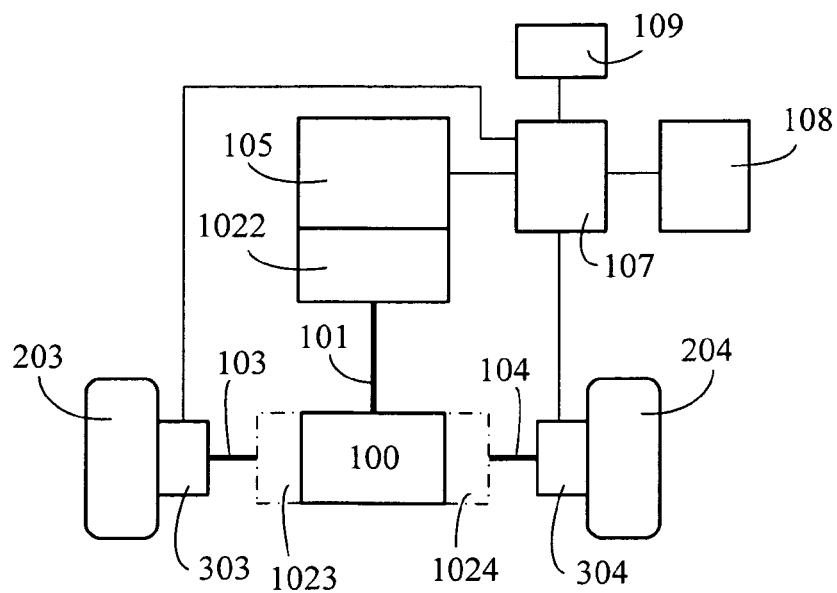
FIG. 2 is a schematic view showing the constituted blocks according to the present invention.

FIG. 2 is a schematic view showing the constituted blocks according to the present invention. As shown in FIG. 2, the differential wheel group with normal closed brakes at two output sides thereof, except for the vehicle and the power source driven by the first running wheel (203) and the second running wheel (204), the main components including:

differential wheel group (100): constituted by epicyclic wheel group or planetary wheel group, which has rotary kinetic energy from a rotary power source (105) formed by the input shaft (101) directly, or through a transmission (1022) to input human power, or engine power, or electric motor power; in which the differential wheel group (100) is installed with a case, and the first differential output shaft (103) directly, or through a transmission (1023), drives the first running wheel (203), and the second differential output shaft (104) directly, or through a transmission (1024), drives the second running wheel (204);

rotary power source (105): formed by human power, or engine power, or electric motor power for directly, or through the transmission (1022), driving the input shaft (101) of the differential wheel group (100);

first running wheel (203), second running wheel (204): for revolution to drive the vehicle or for parking, in which the first running wheel (203) is driven by the first differential output shaft (103), and the second running wheel (204) is driven by the second differential output shaft (104);

normal closed brake (303), (304): related to the brake driven by the driving energy of a drive energy supply device (108), in which the driving energy is composed of electric or magnetic energy, or hydraulic or pneumatic power, or machine power; by way of the control of a control device (107) manipulated by a handling device (109), the brake releases when the driving energy is input and normally closes when the driving energy is not input, and wherein the normal closed brake (303) is installed at the first running wheel (203), and the normal closed brake (304) is installed at the second running wheel (204), for being controlled by the control device (107);

control device (107): constituted by the control device matched with the manipulated driving energy, for being controlled by the handling device (109), to control the normal closed brake (303), and the normal closed brake (304) for closing or releasing;

handling device (109): constituted by the electromechanical device, or the switch unit constituted by solid state electronic circuits, and/or the button device, and/or the indicating device, and/or the rotable adjusting device or the handle, which are matched with the control device (107), for being controlled by the operator;

when the first running wheel (203) and the second running wheel (204) need to perform rotational operation, the control device (107) manipulated by the handling device (109) transmits the driving energy from the drive energy supply device (108) to the normal closed brake (303) and the normal closed brake (304), to make the normal closed brake (303) and the normal closed brake (304) be driven in disengaged status, thus the first running wheel (203) and the second running wheel (204) are in rotational operation; and when the first running wheel (203) and the second running wheel (204) need to be parked or braked, the control device (107) manipulated by the handling device (109) cuts off the driving energy to the normal closed brake (303) and the normal closed brake (304), to make the normal closed brake (303) and the normal closed brake (304) be normally closed in a locking status.

For the differential wheel group with normal closed brakes at two output sides thereof, the normal closed brakes (303) and (304) not only are driven by the driving energy of the drive energy supply device (108), but also are further constituted by the control structure manipulated by human power for being released or locked.

Figure 3:
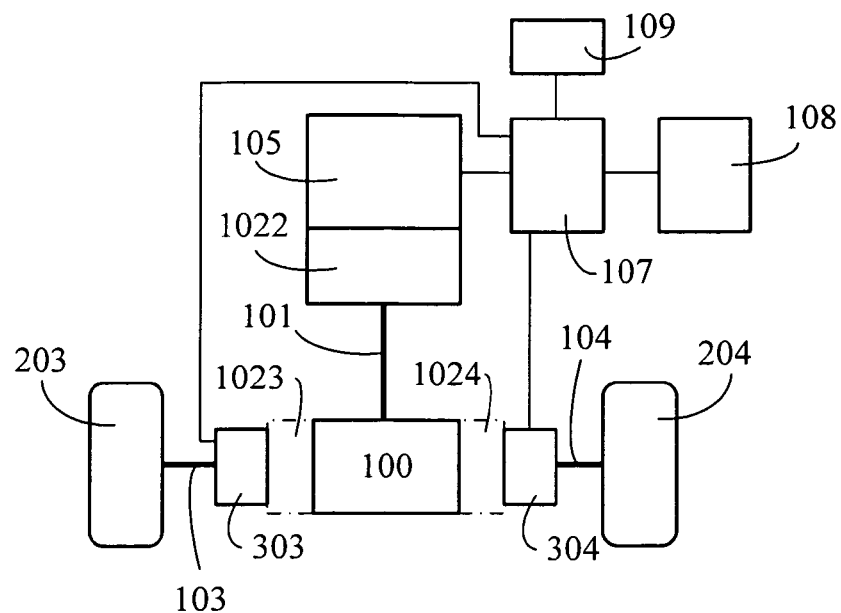
FIG. 3 is a schematic view showing the embodiment of a normal closed brake (303) and a normal closed brake (304) directly, or through a transmission (1023) and a transmission (1024), installed at a differential wheel group (100), respectively, according to the present invention.

For the differential wheel group with normal closed brakes at two output sides thereof, the normal closed brake (303) and the normal closed brake (304) include individually directly, or through the transmission (1023) and the transmission (1024), to be installed at two output sides of the differential wheel group (100); FIG. 3 is a schematic view showing the embodiment of the normal closed brake (303) and the normal closed brake (304) directly, or through the transmission (1023) and the transmission (1024), being installed at the differential wheel group (100), respectively, according to the present invention.

Figure 4:
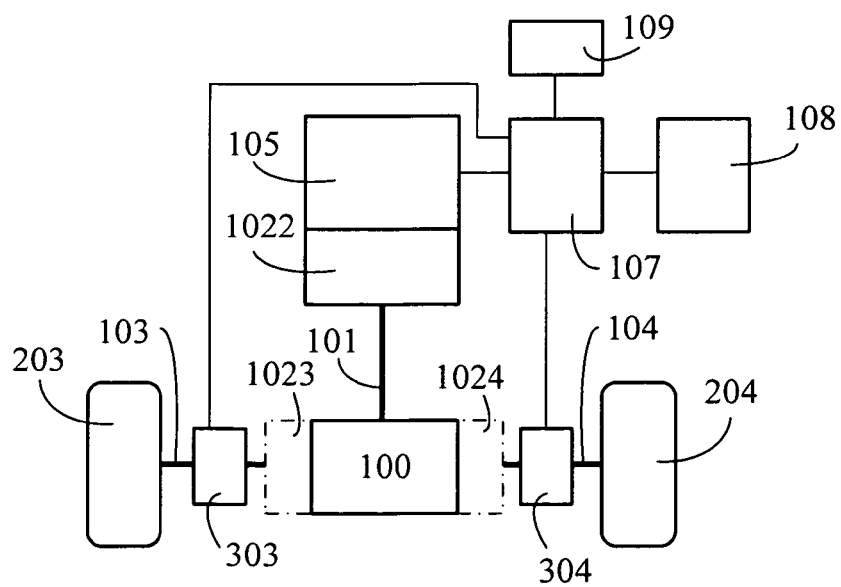
FIG. 4 is a schematic view showing the embodiment of the normal closed brake (303) and the normal closed brake (304) directly, or through the transmission (1023) and the transmission (1024), installed at a first differential output shaft (103) and a second differential output shaft (104), respectively, according to the present invention.

For the differential wheel group with normal closed brakes at two output sides thereof, the normal closed brake (303) and the normal closed brake (304) include individually directly, or through the transmission (1023) and the transmission (1024), to be installed at the first differential output shaft (103) and the second differential output shaft (104); FIG. 4 is a schematic view showing the embodiment of the normal closed brake (303) and the normal closed brake (304) directly, or through the transmission (1023) and the transmission (1024), being installed at the first differential output shaft (103) and the second differential output shaft (104), respectively, according to the present invention.

The invention claimed is:

1. A differential wheel group drive system with normally closed brakes at two output sides thereof, in which one end is for inputting driving power and differential wheel output shafts at two sides are for driving running wheels, and normally closed brakes are individually installed at the two differential output shafts or the running wheels, the main components including:

the differential wheel group (100): constituted by an epicyclic wheel group or a planetary wheel group, which receives rotary kinetic energy from a rotary power source (105) and an input shaft (101) directly, or through a transmission (1022), to input human power, or engine power, or electric motor power; in which the differential wheel group (100) is installed with a case, and a first differential output shaft (103) directly, or through a transmission (1023), drives a first running wheel (203), and a second differential output shaft (104) directly, or through a transmission (1024), drives a second running wheel (204);

the rotary power source (105): formed by a human power source, or an engine, or an electric motor for directly, or through the transmission (1022), driving the input shaft (101) of the differential wheel group (100);

the first running wheel (203) and the second running wheel (204): for rotating to drive a vehicle or for parking, in which the first running wheel (203) is driven by the first differential output shaft (103), and the second running wheel (204) is driven by the second differential output shaft (104);

the normally closed brakes (303), (304): the brakes driven by the driving energy of a drive energy supply device (108), in which the driving energy is composed of electric or magnetic energy, or hydraulic or pneumatic power, or machine power; and controlled by way of a control device (107) manipulated by a handling device (109), the brakes releasing when the driving energy is input and normally closing when the driving energy is not input, and wherein a first of the normally closed brakes (303) is installed at the first running wheel (203), and a second of the normally closed brakes (304) is installed at the second running wheel (204);

the control device (107): constituted by the control device matched with the manipulated driving energy, for being controlled by the handling device (109), to control the first normally closed brake (303) and the second normally closed brake (304) for closing or releasing;

the handling device (109): constituted by an electromechanical device, or a switch unit constituted by solid state electronic circuits, and/or a button device, and/or an indicating device, and/or a rotatable adjusting device or a handle, which are matched with the control device (107) for being controlled by an operator;

wherein when the first running wheel (203) and the second running wheel (204) need to perform rotational operation, the control device (107) manipulated by the handling device (109) transmits the driving energy from the drive energy supply device (108) to the first normally closed brake (303) and the second normally closed brake (304), to cause the first normally closed brake (303) and the second normally closed brake (304) to be driven in disengaged status, thus the first running wheel (203) and the second running wheel (204) are in rotational operation; and wherein whenever the driving energy from the drive energy supply device (108) fails to be supplied to the first normally closed brake (303) and the second normally closed brake (304), the first normally closed brake (303) and the second normally closed brake (304) are closed in a locking status to prevent said rotational operation of the first running wheel (203) and second running wheel (204).

2. The differential wheel group with normally closed brakes at two output sides thereof as claimed in claim 1, wherein the normally closed brakes (303) and (304) not only are driven by the driving energy of the drive energy supply device (108), but also are further constituted by a control structure manipulated by human power for being released or locked.

3. The differential wheel group with normally closed brakes at two output sides thereof as claimed in claim 1, wherein the first normally closed brake (303) and the second normally closed brake (304) are individually directly, or through the transmission (1023) and the transmission (1024), installed at two output sides of the differential wheel group (100).

4. The differential wheel group with normally closed brakes at two output sides thereof as claimed in claim 1, wherein the first normally closed brake (303) and the second normally closed brake (304) are individually directly, or through the transmission (1023) and the transmission (1024), installed at the first differential output shaft (103) and the second differential output shaft (104).

* * * * *